(12) United States Patent
Nieminen et al.

(10) Patent No.: US 7,794,229 B2
(45) Date of Patent: Sep. 14, 2010

(54) LANGUAGE LEARNING SYSTEM AND A DIGITAL STORAGE UNIT

(75) Inventors: Eero Nieminen, Tarvasjoki (FI); Timo Saarni, Turku (FI)

(73) Assignee: Sanako Corporation, Turku (FI)

( * ) Notice: Subject to any disclaimer, the term of this patent is extended or adjusted under 35 U.S.C. 154(b) by 1190 days.

(21) Appl. No.: 10/479,046

(22) PCT Filed: May 31, 2002

(86) PCT No.: PCT/FI02/00468

§ 371 (c)(1),
(2), (4) Date: Feb. 23, 2004

(87) PCT Pub. No.: WO02/097766

PCT Pub. Date: Dec. 5, 2002

(65) Prior Publication Data

US 2004/0148175 A1      Jul. 29, 2004

(30) Foreign Application Priority Data

Jun. 1, 2001   (FI)   .................................. 20011159

(51) Int. Cl.
G09B 5/00 (2006.01)
(52) U.S. Cl. ..................................... 434/169
(58) Field of Classification Search ................. 434/156, 434/159, 308, 319, 320
See application file for complete search history.

(56) References Cited

U.S. PATENT DOCUMENTS 3,609,227 A * 9/1971 Kuljian ......................... 386/54

(Continued)

FOREIGN PATENT DOCUMENTS

EP      0 400 682 A2    12/1990

(Continued)

OTHER PUBLICATIONS

"Memory hierarchy." Wikipedia [online], last updated Apr. 19, 2008 [retrieved on Apr. 23, 2008]. Retrieved from the Internet:<URL:http://en.wikipedia.org/wiki/Memory_hierarchy>.*

(Continued)

*Primary Examiner*—Xuan M. Thai
*Assistant Examiner*—Kesha Y. Frisby
(74) *Attorney, Agent, or Firm*—Birch, Stewart, Kolasch & Birch, LLP

(57) ABSTRACT

Audio recordings and programs are saved as audio files on a digital storage unit in a language learning system comprising student units connected to the digital storage unit. The digital storage unit is provided with a audio interface controller (201) having a dedicated input/output RAM buffer (B1-B63) for each student station. Each RAM buffer has an associated file which is either a fixed file or can be defined for each case. When the audio interface controller (201) receives a record command relating to a specific buffer, the controller (201) opens an audio file associated with the specific buffer, buffers the audio data received from a student station or another source in the buffer, and transfers the contents of the specified buffer to the opened associated audio file. Similarly, in response to a play command relating to a specific RAM buffer, the controller (201) opens an associated audio file in the digital storage unit, transfers audio data from the opened audio file to the buffer, and sends the audio data from the buffer to a respective student station or to other destination.

11 Claims, 2 Drawing Sheets

U.S. PATENT DOCUMENTS

Figure 1:
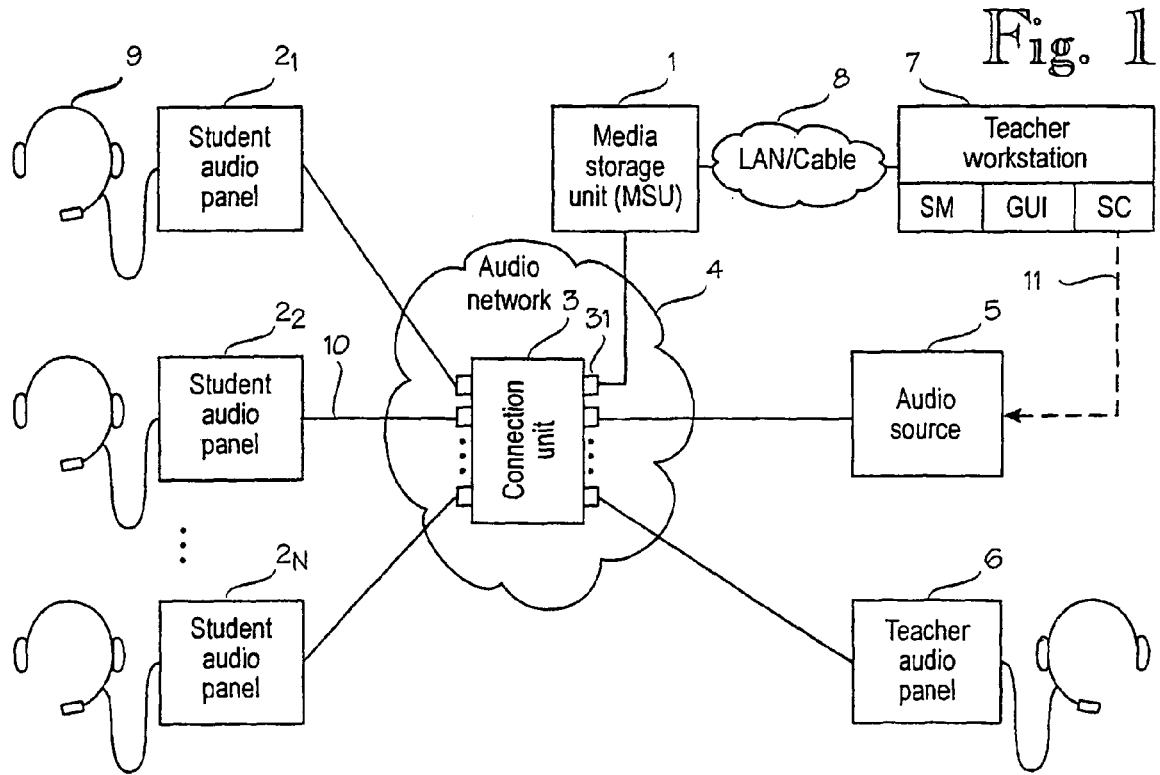

| | | | | |
|---|---|---|---|---|
| 4,172,329 | A | * | 10/1979 | Chen .......................... 434/319 |
| 4,591,929 | A | | 5/1986 | Newsom |
| 5,055,948 | A | * | 10/1991 | Kiyonaga .................... 360/69 |
| 5,065,317 | A | * | 11/1991 | Hiramatsu et al. ............. 704/1 |
| 5,191,617 | A | | 3/1993 | Bolin et al. |
| 5,810,600 | A | | 9/1998 | Okada |
| 6,111,709 | A | * | 8/2000 | Oliver et al. .................. 360/39 |
| 6,198,905 | B1 | * | 3/2001 | Remschel ................... 434/350 |
| 6,296,489 | B1 | * | 10/2001 | Blass et al. ................. 434/185 |

FOREIGN PATENT DOCUMENTS

| | | |
|---|---|---|
| EP | 0 400 682 A3 | 12/1990 |
| EP | 1 168 277 A1 | 1/2002 |
| GB | 2 254 725 A | 10/1992 |
| JP | 05-088603 A | 4/1993 |
| JP | 5303319 A | 11/1993 |
| JP | 10001965 A | 1/1998 |
| JP | 2001-125476 A | 5/2001 |
| WO | WO 99/03083 A1 | 1/1999 |

OTHER PUBLICATIONS

"Data buffer." Wikipedia [online], last updated Apr. 9, 2008 [retrieved on Apr. 23, 2008]. Retrieved from the Internet:<URL:http://en.wikipedia.org/wiki/Data_buffer>.*

"*Disk caching with MS-DOS' Smartdrv.sys*", PC Operating Instructions, Sep. 1993, vol. 4, Issue 9.

* cited by examiner

LANGUAGE LEARNING SYSTEM AND A DIGITAL STORAGE UNIT

This application is the national phase under 35 U.S.C. §371 of PCT International Application No. PCT/FI02/00468 which has an International filing date of May 31, 2002, which designated the United States of America.

The invention relates to interactive language learning systems.

Language laboratory systems relate generally to systems whose object is to train students in hearing and speaking a foreign language in a classroom environment. Language laboratory systems or language learning systems typically comprise a teacher station and a number of student stations connected to the teacher station. The most conventional systems employ a tape recorder as memory means for storing teaching material and student's speech. The teacher station also allows the teacher to control all program sources and student recorders, choose groups and pairs, monitor student activity and contact an individual student, group of students or the whole class. The student can reproduce his recorded voice in order to compare it with the model pronunciation and to monitor his/her progress in learning.

More recent language learning systems employ, instead of a tape recorder, an electronic (digital) recording storage means, such as semiconductor memory.

U.S. Pat. No. 5,065,317 discloses a language laboratory system wherein a plurality of student training stations are connected to a digital storage device. Headsets in the training stations are connected by input and output analog audio signal lines to dedicated A/D-D/A converters in the digital storage device. Further, a control panel of the training stations are each hardwired with a dedicated pair of analog control lines to a control unit in the digital storage device, one of the lines carrying a record command signal and the other line carrying a reproduction command signal. The digital storage device includes also a voice memory having a plurality of storing partitions. The digital storage device comprises also an address memory which stores the starting address data and terminating address data which designates the starting and terminating ends of the storing partition in which the voice information data received from the A/D converter is stored. For example, when the control unit receives a record command signal from a training unit over the respective control line, the control unit stores the voice information data obtained from the A/D converter in a corresponding storing partition of the voice memory. The control unit also stores in an address memory a pair of starting address data and terminating address data of the corresponding storage areas of the storing partition in which the voice information data is stored. On the other hand, when one of the reproduction command signals having a predetermined level, for example, a level representing a logic "1" is supplied to the control unit, the control unit reads one of the pairs of starting address data and terminating address data from the address memory and, using these starting and terminating address data, a control unit further reads a memorized voice information from the storage area in the storing partition of the voice memory which is designated by the read starting and terminating address data. The read voice information data is D/A converted into an analog audio signal which is then supplied to the student training station over a dedicated signal line.

A problem related to this prior art language laboratory system using a digital memory storage is a very complicated management of the stored material in the memory. The prior art system is also a closed system in the sense that importing of teaching and program material to the storage unit and exporting of student recordings from the storage unit is not possible. More-over, a high number of multi-wire cables are required.

An object of the invention is a new type of language learning system using a digital storage.

This object of the invention is achieved by a language learning system and a digital storage unit as defined in the attached independent claims. Preferred embodiments of the invention are defined in the attached dependent claims.

In the present invention, audio recordings and programs are saved as audio files on a digital storage unit in a language learning system comprising student units connected to the digital storage unit. However, normal ways to create and handle audio files are not sufficient for time critical (real time) recording and playing. Therefore, the digital storage unit is provided with an audio interface controller having a dedicated input/output RAM buffer for each student station. In other words, each buffer can be seen as an input or an output to the mass memory in the storage unit. Each RAM buffer has an associated file which is either a fixed file or can be defined for each case. In special cases, the same file can be associated with several of the buffers. When the storage unit receives a record command relating to a specific buffer, it opens an audio file associated with the specific buffer, buffers the digital audio data received from a student station or another source in the buffer, and transfers the contents of the specified buffer to the opened associated audio file. In response to receiving a stop command, the storage unit stops the ongoing recording and closes the associated file. Similarly, in response to a play command relating to a specific RAM buffer, the storage unit opens an associated audio file in the digital storage unit, transfers audio data from the opened audio file to the buffer, and sends the digital audio data from the buffer to a respective student station or to other destination. In the preferred embodiment of the invention, the audio file consists of integer numbers of buffer size blocks, and full data blocks are read or written. In other words, digital audio data is transferred from the buffer to the associated audio file, when the buffer is filled up by received audio data. Similarly, full block of audio data is transferred from the audio file to the buffer, and new block is not transferred until all data in the previous block has been sent to the destination. If recording is stopped when a RAM buffer is only partially filled, according to an embodiment of the invention the partially filled buffer content is transferred to the file, file is closed and information relating to the length of the partially block is saved. In another embodiment block sizes smaller than the buffer size are employed. In the preferred embodiment of the invention, the transfer from the buffer to the associated file, and vice versa, is carried out as a direct memory access (DMA) transfer.

The input/output buffer enable a high speed recording and playing of audio material together with use of audio files for saving the recordings. In the preferred embodiment the audio data and commands are sent in data packets over an audio network, such as an audio local area network (ALAN). The student station can be very simple, typically it needs only acoustic/electrical transducers (e.g. headset with a microphone), A/D and D/A converters, the user interface for inputting command (e.g. a keyboard and optionally a display), and a communication interface for packet mode communication with the digital storage unit over the audio network. As a consequence, the manufacturing cost of the panel is very low. Further, due to the packet mode communication used, the audio network can be implemented with minimum cabling. The use of the audio files in the digital storage unit allows to use standard mass memories, such as hard discs, which reduces the cost of the storage unit. The special purpose memories and complicated memory control disclosed in the U.S. Pat. No. 5,065,317 is avoided. Further, as the recordings and teaching material are saved in audio files in the storage unit, it is possible to apply normal file management operations of computers to these audio files. In an embodiment of the invention, the digital storage unit comprises a server entity enabling audio files in said storage unit being managed by normal file management operations from a computer workstation. This enables for example a teacher workstation to load recorded student audio files from the digital storage unit and/or save media files in the digital storage unit to be played by the student stations.

Figure 2:
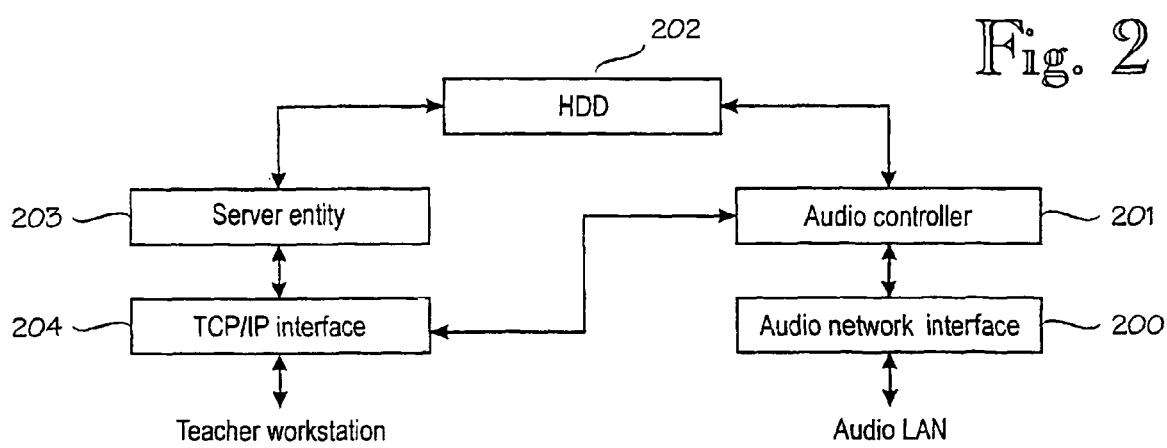
Figures 3, 4:
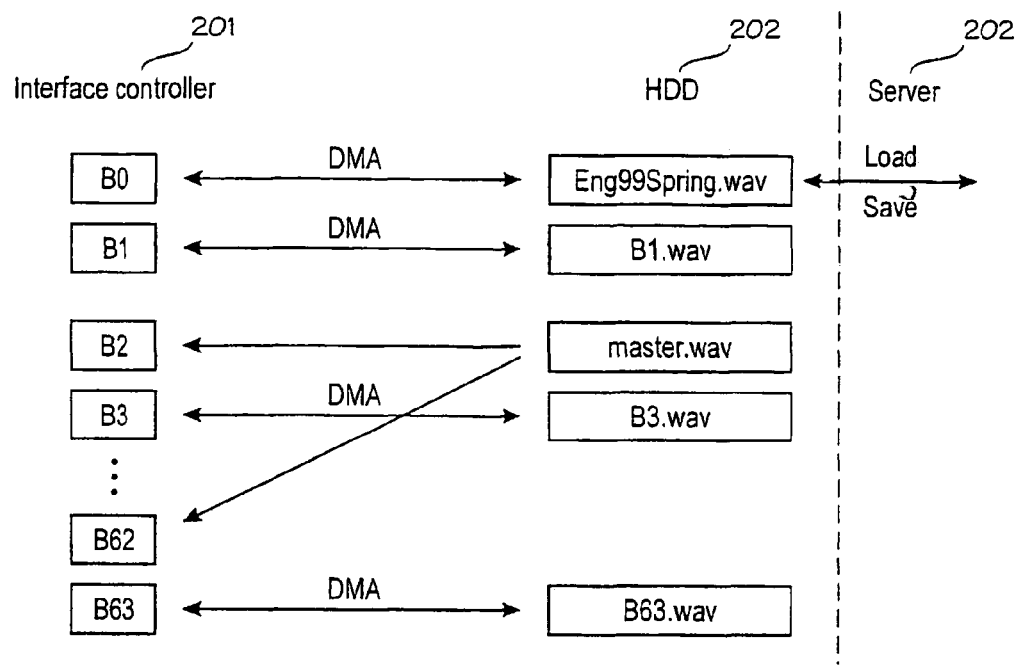

The invention will be now described in more detail by means of preferred embodiments with reference to the accompanying drawings, in which FIG. 1 illustrates a learning system according to an embodiment of the invention, FIG. 2 is a block diagram of a media storage unit, FIG. 3 illustrates RAM buffers, audio files, and a DMA transfer between the buffers and files, and FIG. 4 illustrates a data packet format.

The system components of a language learning system according to preferred embodiment of the invention is illustrated in FIG. 1. The learning system comprises a number N of student audio panel $2_1 \ldots 2_N$, audio source 5, teacher audio panel 6 and a media storage unit (MSU) 1 interconnected via an audio network, such as an audio local area network 4. In the embodiment shown in FIG. 1, the audio network 4 comprises a connection unit 3 having a plurality of connection ports 31 to which the student audio panels, the media storage unit 1, the audio source 5, and the teacher audio panel 6 are connected by cable into a star network configuration. The language learning system further comprises a teacher computer workstation 7 (e.g. ordinary PC) connected to the media storage unit 1 via a normal LAN or cable 8.

Student audio panels $2_1 \ldots 2_N$ and the teacher audio panel 6 are provided with a headset 9 (i.e. earphones and a microphone) which is connected to the audio panel. The audio panels perform the necessary analog-to-digital (A/D) and digital-to-analog (D/A) conversions to the analog audio signal from the microphone and to the digital audio signal received over the audio network 4, respectively. The audio panels 2, 6 further include a user interface, e.g. a keyboard and a display, for entering commands and displaying messages. The audio panels 2, 6 further include a communication interface for sending and receiving commands, messages and digital audio data in data packets. The panels 2, 6 are connected to the connection unit 3 using cables 10, such as Ethernet cables, which also supply electrical power to the audio panels 2, 6 from the connection unit 3 so that no power source is needed in the audio panels.

Audio source 5 provides an input for an external program source. In case a analog external program is inputted, the audio source 5 provides the necessary A/D conversion. Also the audio source 5 includes a communication interface for sending and receiving digital audio data in data packet over the audio network 4. The audio source 5 may also include a audio line output for supplying an analog audio signal to an external device. The audio source 5 may also include a D/A conversion for providing the analog output signal. The external program source connected to the audio source 5 may be any suitable audio source. In FIG. 1, a sound card SC of teacher workstation 7 is connected the audio source 5 by a cable 11. This allows any audio program from a audio CD, a media file, etc., which can be played at a normal workstation by means of a sound card, also be played to the student audio panels and recorded to the media storage unit as a master program, when the audio signal is supplied to the audio source 5 and sent in data packets over the audio network 4. Other examples of possible external audio sources are MP3 player, cassette recorder, etc.

All the communication over the audio network 4 is packet mode communication. The data packet may have a format illustrated in FIG. 4. In the preferred embodiment of the invention, the data packets contain primarily ASCII characters for easier monitoring and debugging. Binary data is presented in HEX ASCII. The parts of the data packet are START (contains one character), ADDRESS (contains four characters, 12 bits), IDENTIFIER (at least one character) which defines the type of message or command code, DATA field, CHECKSUM (two characters), which may be a simple bit sum of eight bits (may be using XOR operation), and END (one character). The connection unit 3 carries out all the mixing and routing from one audio panel 2, 6 to another, and between the audio panels 2, 6 and the media storage unit 1. The mapping between the port numbers and a variety of devices 1, 2, 5 and 6 connected to the ports 31 is established when the system is set up. It may be possible to modify this configuration from the teacher workstation via the media storage unit 1 as will be explained later. In the preferred embodiment of the invention, the teacher workstation 7 is also able to modify the routing tables in the connection unit so as to provide different student pairs or groups for practices. The data transmission bandwidth between the student audio panel and the connection unit may be, for example, 1 Mbps for audio and 16 kbps for control data. Assuming that 32 audio panels are connected to the connection unit, the data transmission bandwidth between the connection unit 3 and the media storage unit 1 may be, for example, 4 Mbps for control data and 32 Mbps for audio. The audio bandwidth supported is preferably 15 kHz or higher. The digital audio data provides many advantages, such as a high signal-to-noise ratio (SNR), high immunity to external interference, and the audio quality being unaffected by the length of the student cable 10.

The media storage unit 1 provides a storage for teaching program (master) and student recordings. A block diagram of a media storage unit according to an embodiment of the invention is shown in FIG. 2. In the preferred embodiment of the invention the mass memory in the media storage unit 1 is provided by a hard disc drive (HDD) 202. It is preferably a normal HDD manufactured for personal computers or servers. The media storage unit (MSU) 1 has also an audio network interface 200 to the audio network 4, such as an Ethernet interface. All the data packets received from the audio network 4 are forwarded from the interface 200 to an interface controller 201. In the opposite direction, data packets supplied by the interface controller 201 are sent via the interface 200 to the audio network 4.

The interface controller 201 includes a plurality of RAM buffers, two for each audio panel connectable to the audio network 4. Each RAM buffer functions as an input to or an output from an associated file in the HDD 202, depending on whether the audio data is recorded to the file or played from the file.

Referring to FIG. 3, 64 buffers B0, B1, B2, ... B62, and B63 are shown in the interface controller 201. Let us assume, that buffers B0 and B1 are assigned to student audio panel $2_1$, buffers B2 and B3 are assigned to student audio panel $2_2$, etc. The buffers with uneven numbers, i.e. B1, B3, B5, ... B63 are buffers for recording and playing student voice. The audio files associated with these buffers B1, B3, ... B63 are fixed, i.e always the same files. In FIG. 3, these fixed files are illustrated by files B1.Wav, B3.Wav, ... B63.Wav. The buffers with even number, i.e. buffers B0, B2, ... B62, are intended for recording the master program, typically played from the external audio source called a master. Audio files associated with buffers B0, B2, . . . B62 are variable (can be defined for each case). This allows also that the same file can be associated with two or more buffers B0, B2, . . . B62. In FIG. 3, the audio file Eng 99 Spring.WAV is associated with a buffer B0. The audio file master.WAV is associated with both the buffer B2 and the buffer B62. The audio data is transferred from the buffers B0-B63 to the associated files and from the associated files to the buffers by means of a DMA (direct memory access) transfer. Each audio file in the HDD 202 consists of integer number of data blocks having a size equal to or smaller than the buffer size. The buffer size may be for example 128 kb, which represents two seconds of audio when sampling rate of 32 kHz and resolution of 16 bits is used. The buffer size may be dynamically variable. In the preferred embodiment only full blocks of 128 kb are written from the buffers to the files or read from the files to the buffers. Only if the recording is stopped when a RAM buffer is only partially filled, the content of the partially filled buffer is transferred to the file and the length information of the shorter data block is saved.

The interface controller 201 provides various recorder operations according to commands received from the audio panels 2, 6 or from the teacher workstation. The three basic recorder operations are PLAY fills the specified RAM buffer from a pre-defined disc file, RECORD transfers contents of the specified RAM buffer to a pre-defined disc file, PAUSE pauses ongoing data transfer, STOP stops ongoing recording or playing and closes the file.

The commands supplied to the interface controller 201 associate a file with a buffer and define a direction of the data transfer, i.e. playing/recording. Commands also cause the interface controller 201 to start playing or recording a buffer (s) and associated file(s). In the following, examples of possible commands are listed.

Record master only causes the interface controller to record a specified buffer to a specified file. For example, content of buffer B4 is transferred to the audio file Eng 99 Spring.WAV.

Record master and students cause an interface controller 201 to record a specified master buffer to a specified file. For example, the content of buffer B0 is transferred to the file Eng 99 Spring.WAV. The command also cause the interface controller 201 to record the student buffers B1, B3, . . . B63 to corresponding fixed files B1.WAV, B3.WAV. B63.WAV, respectively.

Record students only cause the interface controller to record the student buffers B3, B5, . . . B63, to the corresponding fixed files, B3.WAV, B5.WAV, . . . B63.WAV, respectively.

Play master only causes the interface controller 201 to fill specified buffers from a specified (master) file. For example, buffers B2 and B62 are filled from the audio file master.WAV.

Play students only will cause the interface controller 201 to fill the named student buffers B1, B3, . . . B63 from the corresponding fixed files B1.WAV, B3.WAV, . . . B63.WAV.

Play master and students will cause the interface controller 201 to fill the specified ones of the master buffers B0, B2, . . . B62 from the specified file, such as the master.WAV, and to fill the named student buffers B1, B3, . . . B63 from the corresponding fixed files B1.WAV, B3.WAV, . . . B63.WAV.

Let us now consider recording to and playing from the hard disc files by means of examples. Let us assume that the interface controller is commanded to record from the RAM buffer B1 to the audio file B1.WAV. The interface controller receives data packets from the student audio panel $2_1$ over the audio network 4 and the audio interface 200. These data packets contain an address assigned to the buffer B1. Therefore, the interface controller inputs the payload in the data field of the data packets to the buffer B1. Having filled the buffer B1 with the audio data received in the data packets, the interface controller 201 transfers the content of the data buffer 1 as a single data block to the audio file B1.WAV in the hard disc 202. Then the interface controller 201 starts to refill the buffer B1 with the received audio data. The recording is continued until a stop command is received or a maximum size of the audio file is reached. In response to the stop command, the interface controller 201 stops inputting new audio data to the buffer B1 but transfers the content of the partially filled buffer B1 to the file B1.WAV and closes the file. The interface controller also saves length information of the last data block.

Let us then assume that the interface controller 201 has received a command to play audio data from the audio file B1.WAV to the buffer B1. The buffer B1 is filled with a first data block of the buffer size transferred form the file B1.WAV. Interface controller 201 inserts the audio data from the buffer B1 to data fields of data packets which are addressed to the student audio panel $2_1$, and sends these data packets to the audio network 4. When the buffer 1 has been emptied, a new data block of buffer size is transferred from the file B1.WAV to the buffer B1, and the previous operation is repeated. This continues until the interface controller 201 receives a stop command or all data in the audio file B1.WAV has been read.

The file format of the audio files may be any suitable format, but WAV format is preferred.

The media storage unit 1 includes also another communication interface 204, preferably TCP/IP interface, for communication with the teacher workstation 7 over the normal LAN/cable connection 8. The interface 204 is connected to a server entity 203 and to the interface controller 201. The server entity 203 provides a server function which enables the workstation 7 to perform normal file management operations to the hard disc drive 200 in a similar manner as to any disc within the workstation or in a normal LAN. These file management operations include at least loading and saving a file. As the files created and/or used by the interface controller 201 are standard files, the server entity 203 allows to load these files to the teacher workstation and to save new media files to the HDD to be used as internal master program sources. This makes the media storage unit 1 as a open system which is a major benefit in comparison with the prior art closed digital memory systems.

The teacher workstation 7 can also communicate with the interface controller 201 and further with the connection unit 3 or the audio panels 2, 6 via the interface 204. All commands or data addressed to the interface controller 201 or to the devices in the audio network 4 are routed from the interface 204 to the interface controller 201. If the interface controller receives a command addressed to itself, it reacts accordingly. If a data or command is destined to the connection unit 3, or one of the audio panels, the interface controller sends the data or command to the target device in the data packets. Similarly, any data or command received from the audio network 4 and addressed to the teacher workstation is forwarded to the workstation 7 via the interface 204 by the interface controller 201. This enables the teacher workstation to send messages and commands to any device in the system and to configure the system for different exercises.

The teacher workstation 7 may include a system manager function SM and a graphical user interface GUI for managing and controlling of the system.

In an embodiment of the invention the graphical user interface is based on an activity approach. An activity means a pre-defined lesson plan for exercise, e.g. Listening comprehension and model imitation. The user interface software has some activities as default lesson plans. For example, a list of activities shown in the user interface may include one or more of the following: listening comprehension; model limitation, read allowed exercise; phone conversation; pair discussion; group discussion; simultaneous interpreting; consecutive interpreting; record response; and quiz test. In the activity approach, the teacher can select an activity he/she wants the students to accomplish. The activity can be directed to all the students or to a group of students. The user initiates an activity for a session, that is, for a group of students. In response to the selection of activity, a panel appears on the user interface which contains all the control needed in proceeding the selected activity. The session panel may include the following functionality: 1) student selection; 2) activity selection; 3) source selection; 4) starting the activity; 5) ending the activity.

The activity (procedure) is a kind of a template for the lesson, since the session panel is structured to follow the steps of the actual activity procedure. The activities are very easy to modify. Additionally, new activities are very easily added to the user interface. At a time, only those controls are visible/enabled which are needed in the particular phase of the activity.

Although the present invention has been described with respect to preferred embodiments, various changes and modifications which are obvious to person skilled in the art are deemed to lie within the spirit and scope of the invention.

The invention claimed is:

1. A language learning system comprising a plurality of student audio stations connected to a common digital storage unit, said student audio stations being able to simultaneously with but independently from each other store audio recordings to and play stored audio recordings from said common digital storage unit over a digital audio network having a connection unit comprising a dedicated port for each of said student stations and said common digital storage unit, said connection unit being enabled to route audio signals and commands in data packets between said student stations and said common digital storage unit, said common digital storage unit comprising:
 a hard disk unit common to said plurality of student stations,
 a plurality of dedicated input/output RAM buffers, wherein each student audio station is linked to different one of the dedicated input/output RAM buffers,
 an audio interface controller responsive to a record command received from a student audio station for opening an audio file in said hard disk unit, for buffering audio data received from a student audio station in the respective one of said dedicated buffers and for transferring the contents of the buffer to said opened audio file,
 said audio interface controller of said hard disk unit being responsive to a play command received from a student audio station for opening an audio file in said hard disk unit, for transferring stored audio data from said opened audio file to a respective input/output buffer, and for sending said audio data from said respective buffer to the respective student audio station which sent the play command, and
 in addition to said plurality of input/output RAM buffers, a dedicated second input/output RAM buffer for each student station for recording a master program or played from another source into a respective second specified file and/or playing a recorded master program or a saved media file from said respective second specified audio file.

2. A system as claimed in claim 1, wherein said dedicated pair of first and second input/output RAM buffers of each student audio station can be controlled to record simultaneously, to play simultaneously, or one buffer to record and the other buffer to play to and/or from separate audio files.

3. A system as claimed in claim 1, wherein said computer workstation is connected to said hard disk unit over a network other than said audio network.

4. A system as claimed in claim 1, wherein said connection unit is reconfigurable by a teacher workstation either directly or via said hard disk unit.

5. A system as claimed in claim 4, wherein said teacher workstation has a graphical user interface which employs an activity approach in controlling learning activities.

6. A system as claimed in claim 1, wherein said play command and/or said record command is received from a respective student audio station or from a teacher's computer workstation.

7. A system as claimed in claim 1, further comprising a second communication interface with a server entity for loading recorded student audio files from said digital storage unit and/or for saving media files in said hard disk unit from a computer workstation.

8. A digital storage unit for a language learning system comprising a plurality of student audio stations connected to a common digital storage unit, said digital storage unit storing audio recordings and playing stored audio recordings for said student audio stations, said common digital storage unit comprises:
 a hard disk unit common to said plurality of student stations,
 an audio network interface connectable to a digital audio network via a connection unit comprising a dedicated port for each of said student stations and said digital storage unit, said connection unit being enabled to route digital audio signals and commands in data packets between said student stations and said digital storage unit,
 a plurality of dedicated input/output RAM buffers, wherein each student audio station is linked to different one of the dedicated input/output RAM buffers such that each student audio station is able to store audio recordings to and play audio recordings from said hard disk unit through its dedicated input/output RAM buffer simultaneously with but independently from other student audio stations,
 an audio interface controller enabled to, when a record command is received from a student audio station for opening an audio file in said hard disk unit, to buffer audio data received from a student audio station in the respective one of said dedicated buffers and for transferring the contents of the buffer to said opened audio file,
 said audio interface controller enabled to, when a play command is received from a student audio station to open any audio file in said hard disk unit, for transferring stored audio data from said opened audio file to a respective input/output buffer, and for sending said audio data from said respective buffer to a respective student audio station which sent the play command, and
 in addition to said plurality of dedicated input/output RAM buffers, a dedicated second input/output RAM buffer for each student station for recording a master program played from another source into a respective second specified file and/or playing a recorded master program or a saved media file from said respective second specified audio file.

9. A unit as claimed in claim 8, wherein
said dedicated pair of first and second input/output RAM buffers of each student audio station can be controlled to record simultaneously, to play simultaneously, or one buffer to record and the other buffer to play to and respectively from separate audio files.

10. A unit as claimed in claim 8, further comprising a second communication interface with a server entity for loading recorded student audio files from said digital storage unit and/or for saving media files in said hard disk unit from a computer workstation.

11. A language learning system comprising a plurality of student audio stations connected to a common digital storage unit, said student audio stations being able to simultaneously with but independently from each other store audio recordings to and play stored audio recordings from said digital storage unit, comprising
- a digital audio network transferring digital audio signals and commands between the student audio stations and said common digital storage unit in form of data packets,
- a connection unit comprising a dedicated port for each of said student stations and said digital storage unit, said connection unit being enabled to route digital audio signals and commends in data packets between said student stations and said common 'digital storage unit,
- a hard disk unit in said digital storage unit,
- a plurality of dedicated input/output RAM buffers in said common digital storage unit, wherein each student audio station is linked to different one of the dedicated input/output RAM buffers,
- an audio interface controller in said common digital storage unit, said audio interface controller being responsive to a record command received from a student audio station for opening an audio file in said hard disk unit, for buffering audio data received from a student audio station in the respective one of said dedicated buffers and for transferring the contents of the buffer to said opened audio file,
- said audio interface controller of said common digital storage unit being responsive to a play a play command received from a student audio station for opening any audio file in said hard disk unit, for transferring stored audio data from said opened audio file to a respective input/output buffer, and for sending said audio data from said respective buffer to a respective student audio station which sent the play command,
- a second plurality of dedicated second input/output RAM buffers in said common digital storage unit, wherein each student audio station is linked to different one of the dedicated second input/output RAM buffers, said second input/output RAM buffer recording a master program played from another source into a respective second specified file and/or playing a recorded master program or a saved media file from said respective second specified audio file in said hard disk unit,
- said dedicated pair of first and second input/output RAM buffers of each student in said common digital storage unit can be controlled to record simultaneously, to play simultaneously, or one buffer to record and the other buffer to play to and/or from separate audio files in said hard disk unit, and
- said common digital storage unit further comprising a second communication interface with a server entity for loading recorded student audio files from said digital storage unit and/or saving media files in said hard disk unit from a computer workstation.

* * * * *